(12) United States Patent
Haskins

(10) Patent No.: US 10,239,687 B1
(45) Date of Patent: Mar. 26, 2019

(54) ABOVE GROUND WATER TANK FILL/DRAIN SYSTEM

(71) Applicant: Isaac Haskins, Westminster, CO (US)

(72) Inventor: Isaac Haskins, Westminster, CO (US)

(*) Notice: Subject to any disclaimer, the term of this patent is extended or adjusted under 35 U.S.C. 154(b) by 124 days.

(21) Appl. No.: 15/379,464

(22) Filed: Dec. 14, 2016

Related U.S. Application Data

(60) Provisional application No. 62/268,694, filed on Dec. 17, 2015.

(51) Int. Cl.
| | | |
|---|---|---|
| *B65D 88/54* | (2006.01) | |
| *F16L 41/14* | (2006.01) | |
| *B65D 90/04* | (2006.01) | |
| *F16L 5/06* | (2006.01) | |
| *B65D 90/00* | (2006.01) | |
| *B65D 90/24* | (2006.01) | |
| *B65D 88/02* | (2006.01) | |

(52) U.S. Cl.
CPC ............. *B65D 88/54* (2013.01); *B65D 88/02* (2013.01); *B65D 90/0066* (2013.01); *B65D 90/046* (2013.01); *B65D 90/24* (2013.01); *F16L 5/06* (2013.01); *F16L 41/14* (2013.01); *F17C 2201/052* (2013.01); *F17C 2270/0134* (2013.01); *Y10T 137/048* (2015.04); *Y10T 137/0458* (2015.04); *Y10T 137/474* (2015.04); *Y10T 137/612* (2015.04); *Y10T 137/6123* (2015.04); *Y10T 137/8622* (2015.04)

(58) Field of Classification Search
CPC ....... F16L 5/06; F16L 41/14; F17C 2201/052; F17C 2270/0134; B65D 88/02; B65D 88/54; B65D 90/046; Y10T 137/6123; Y10T 137/612; Y10T 137/0458; Y10T 137/048; Y10T 137/474; Y10T 137/8622

See application file for complete search history.

(56) References Cited

U.S. PATENT DOCUMENTS

| | | | | |
|---|---|---|---|---|
| 1,613,738 A * | 1/1927 | Bessonett | .......... | F01M 11/0408 184/1.5 |
| 2,456,195 A * | 12/1948 | Jackson | .................. | F17C 3/022 137/587 |
| 2,490,319 A * | 12/1949 | Palsgrove | ................. | F23K 5/14 137/453 |
| 2,626,054 A * | 1/1953 | Henigman | ............. | B67D 7/766 210/533 |
| 3,556,351 A * | 1/1971 | Williams | ................ | A62C 27/00 222/192 |
| 2015/0059891 A1 * | 3/2015 | Ducharme | ............. | B65D 88/54 137/585 |

\* cited by examiner

*Primary Examiner* — Atif H Chaudry
(74) *Attorney, Agent, or Firm* — Patent Law Offices of Rick Martin, P.C.

(57) ABSTRACT

A trench is dug under an above ground water storage tank either before erection of the walls or after the wall is erected. A (rectangular) sump is preferably made of ¼ inch steel. It serves as a conduit from an inner tank liner port to an outside tank fill or drain port. The system eliminates hoses hung over the top edge of the tank wall. A pump can fill the tank from the outer port. The tank can be drained using head pressure of the water and/or a pump.

17 Claims, 9 Drawing Sheets

Fig. 2 A
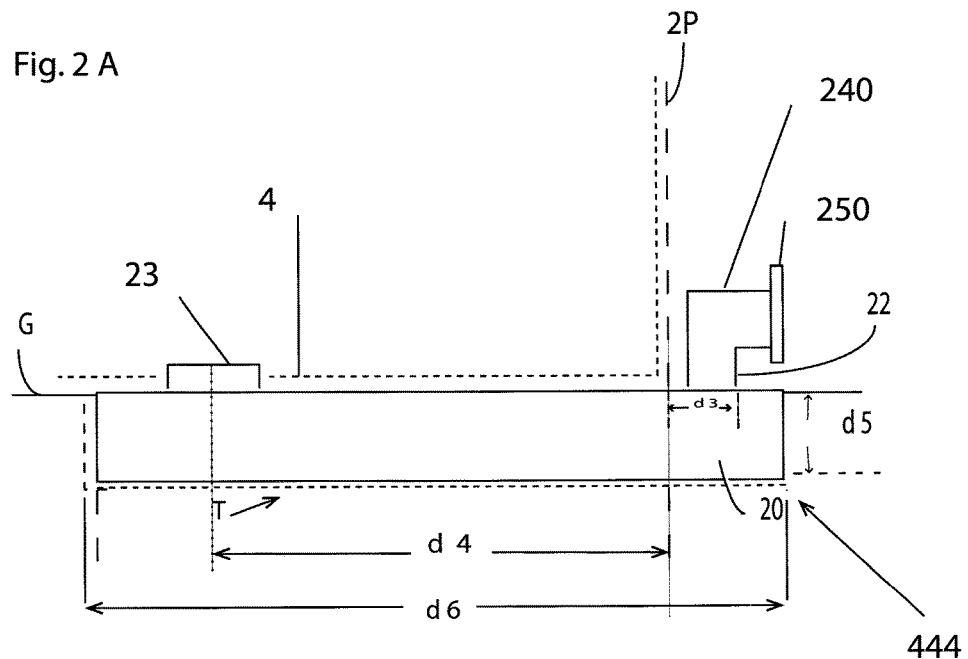
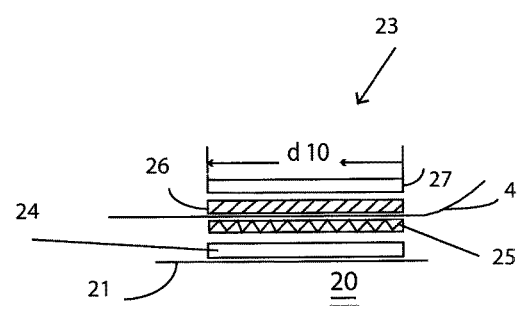
Fig. 2 B

US 10,239,687 B1

ABOVE GROUND WATER TANK FILL/DRAIN SYSTEM

CROSS REFERENCED PATENT APPLICATION

This is a non-provisional application claiming priority from provisional application Ser. No. 62/268,694 filed Dec. 17, 2015, wherein the provisional application is incorporated herein by reference in its entirely.

FIELD OF INVENTION

The present invention relates to rapidly filling and draining a large above ground water tank such as a fracking water storage tank.

BACKGROUND OF THE INVENTION

Referring first to FIGS. 1A, 1B large frack water storage tanks 1 are assembled using steel panels 2 that may stand twelve feet high. Clamps 3 hold the panels 2 together. A plastic liner 4 (nominally polyethylene or polypropylene over a geotextile underlay garment) holds the water 5, thus preventing leakage through seams 6. Multiple fill/drain hoses 7, 8 are draped over the top edge 9 of the tank 1. To fill the tank 1 a truck with a pump or a pump fed by a pond is connected to a hose inlet 10. Arrows IN on hose 8 shows a fill operation. Arrows OUT on hose 7 show an empty operation which also requires a pump (not shown). Thus, energy is required to empty the tank. Also some water at a height d1 cannot be pumped from the tank 1. An expensive vacuum operation is needed to completely empty the tank 1 when the tank is to be relocated. Valves 11 are used to control the fill/drain operations, these tanks 1 can vary anywhere from 4500 to 41,000 barrels.

What is needed in the art is a fill/drain system that reduces energy and labor costs to the operator. The present invention provides a trench under the panel 2 to use headwater pressure to completely empty the tank 1. The hoses are eliminated. Thus, labor, energy and materials costs are reduced as well as gaining a benefit of reduced time to tear down a large tank.

SUMMARY OF THE INVENTION

The main aspect of the present invention is to provide an underground sump to use head pressure for completely draining an above ground water storage tank.

Another aspect of the present invention is to provide a watertight seal from the liner to the underground sump.

Another aspect of the present invention is to provide an above ground easily accessible flange for a hose hookup.

Another aspect of the present invention is to provide a suction means to empty the underground sump for relocation.

Another aspect of the present invention is to provide a double capacity underground sump.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 2A is a side elevation view of an underground sump being installed.

FIG. 2B is a close up side elevation view of the filler port.

Figure 1:
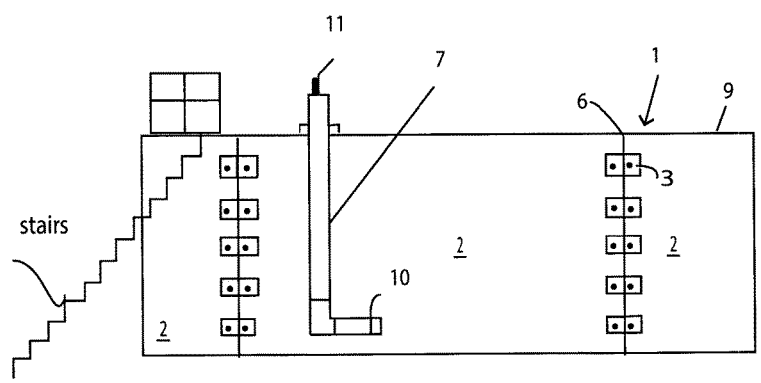
FIG. 1A (prior art) is a front elevation view of an above ground water storage tank.
FIG. 1B (prior art) is a cross sectional view of the tank shown in FIG. 1.
Figure 1:
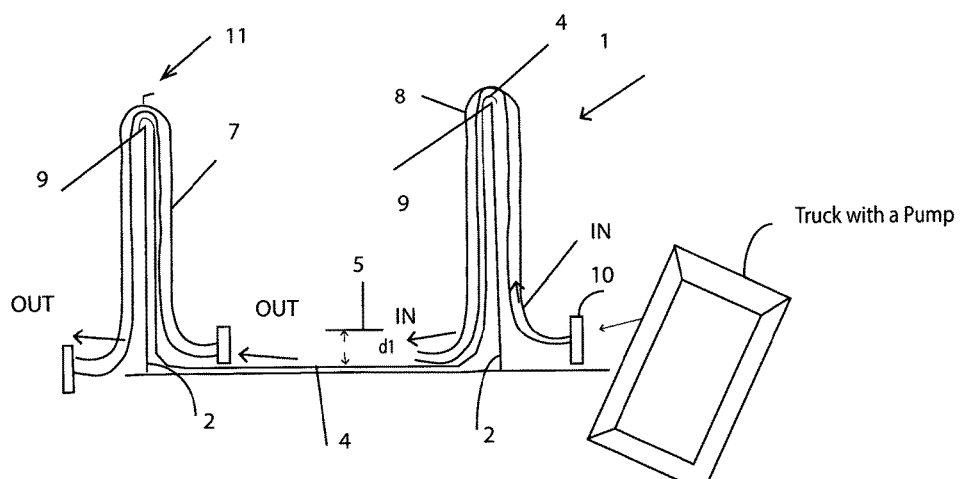

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Referring first to FIGS. 2A, 2B the install process for a new above ground tank is shown. The ground G has been cleared of sharp rocks, and the liner 4 has been spread across the circular outline of the tank. A trench T has been dug at a periphery of the tank where dotted line 2P shows where the panel 2 will be erected. The trench T is about eight feet long (d6) by one foot wide to accommodate the sump 20. It is about six inches deep (d5) so the top of the sump 21 is flush with ground G. The front of the sump 22 is about nine inches (d3) from the panel 2. This places the inside port 23 about 7' inside the panel 2 (d4=7'3").

The outer flange port arch 240 has a hose flange 250 for hookup to a hose from a truck or from a pond or to a drill site. The outer port arch 240 is mounted above outer hole 444. The inside port 23 consists of a donut shaped flange 24 welded to the top 21 of the sump 20. Next up is a bottom gasket 25, then comes the liner 4 with a hole cut into it (usually ten inch). Then comes an upper gasket 26. Then comes a top donut flange 27. See FIGS. 3, 4 for further details. Distance d11 is usually 20 inches. Once the liner is secured the panel 2 can be erected as the outer wall of tank 1. An embodiment not shown takes an existing tank and lifts up the liner at a peripheral edge. The trench is dug under the panel 2. Then the liner is attached to the liner port 23. Then the liner is extended up to the top of panel 2.

Figure 3:
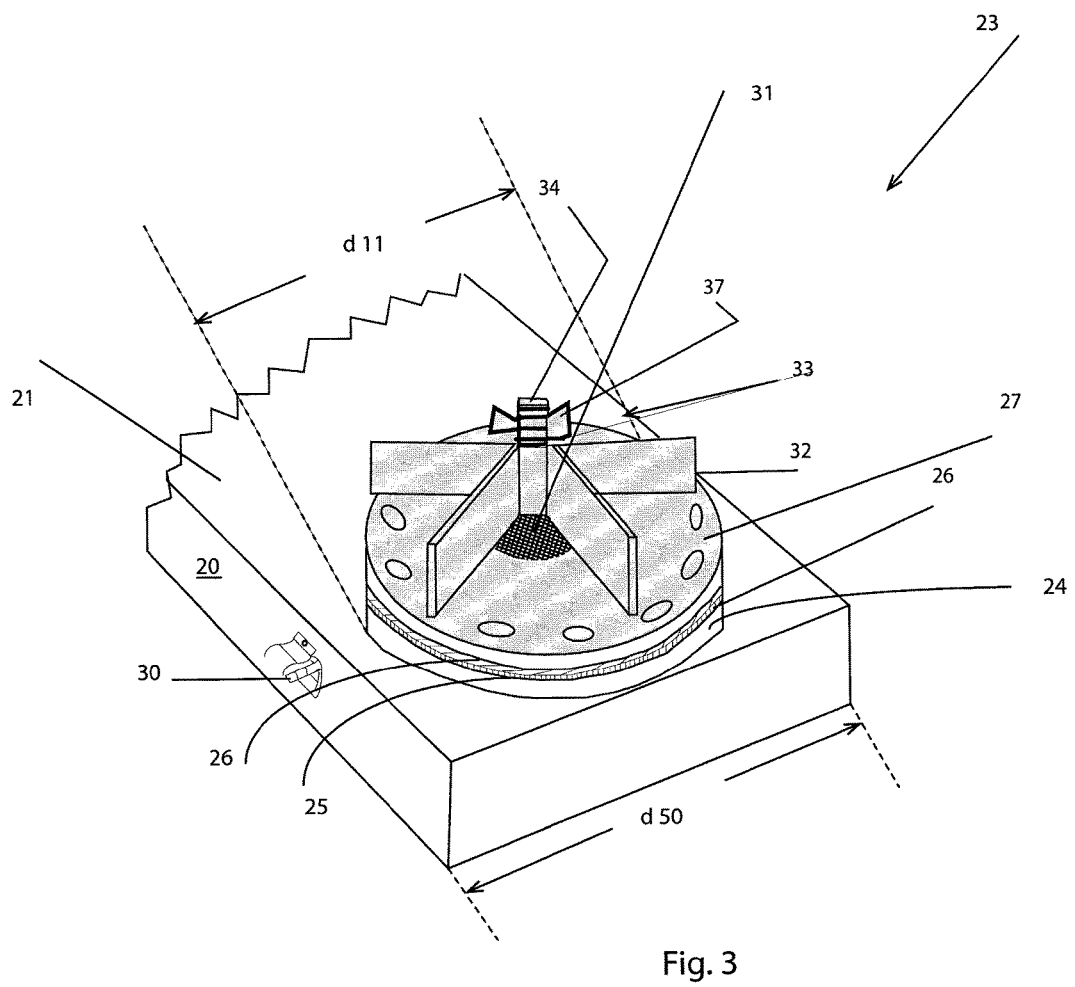
FIG. 3 is a rear perspective view of the liner connection for the sump.
Figure 4:
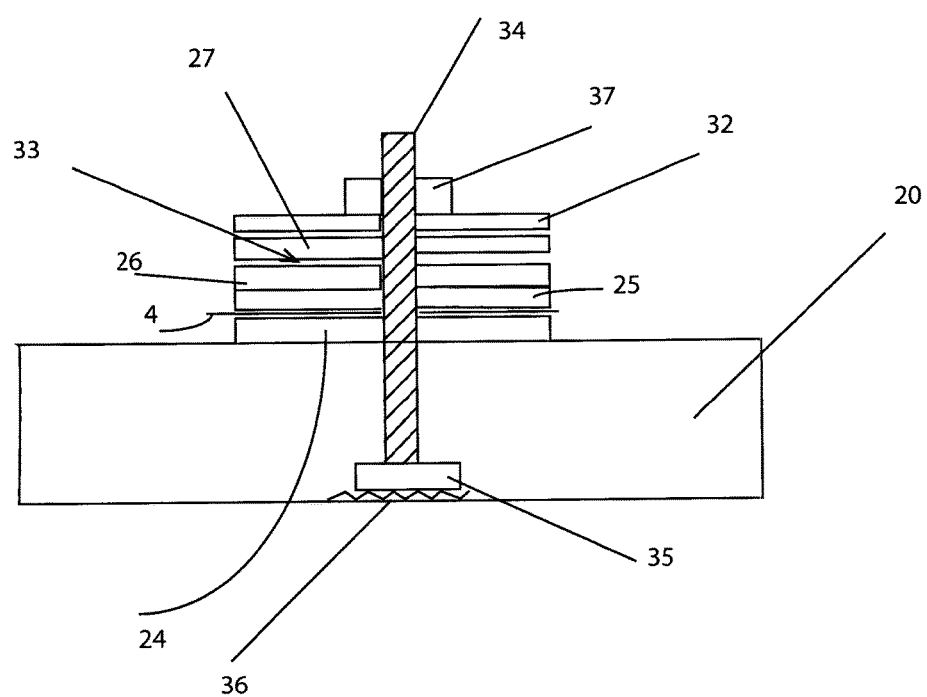
FIG. 4 is a cross sectional view of the liner connection for the sump.

Referring next to FIGS. 3, 4 the inside port 23 is disclosed in detail. The flange 24 has a screen 31 welded across its orifice. This prevents debris such as a glove from being sent downstream. An X clamp 32 has a central cavity 33 through which the all-thread 34 passes. A nut 35 is welded to the bottom of the sump at 36. The all-thread 34 is tightened into the nut 35. The X clamp 32 slides down the all-thread 34. A lock nut 37 tightens the flange 27 against the liner 4.

Below follows the steps to secure the liner 4 to the sump 20.
1) Cut 10 inch hole in liner
2) Weld 10" flange 24 on top
3) Place basket (rubber ⅛") 25 on flange 24
4) Place liner 4 on to P gasket 25
5) Cut hole in liner 4

6) Place top flange with center brace 32 and gasket 26 on top of liner 4

7) Tighten nut 37 after all-thread 34 is tightened down into anchor nut 35.

Figure 5:
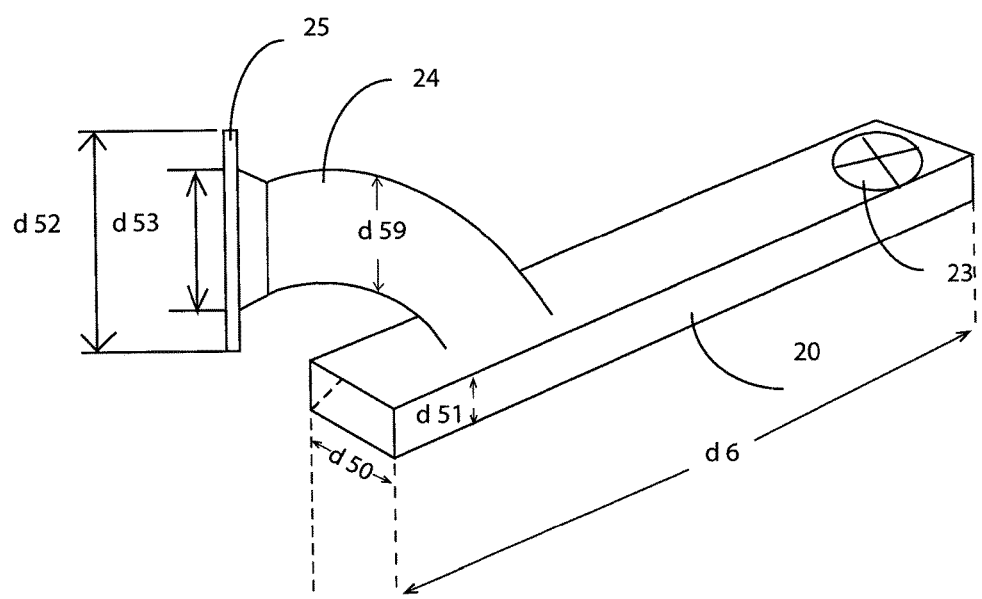
FIG. 5 is a top perspective view of a single inlet sump.

FIG. 5 shows a single port sump 20 with dimensions d6=96"; d50=12"; d51=6"; d52=15"; d53=12"; d59=10.0".

Figure 6:
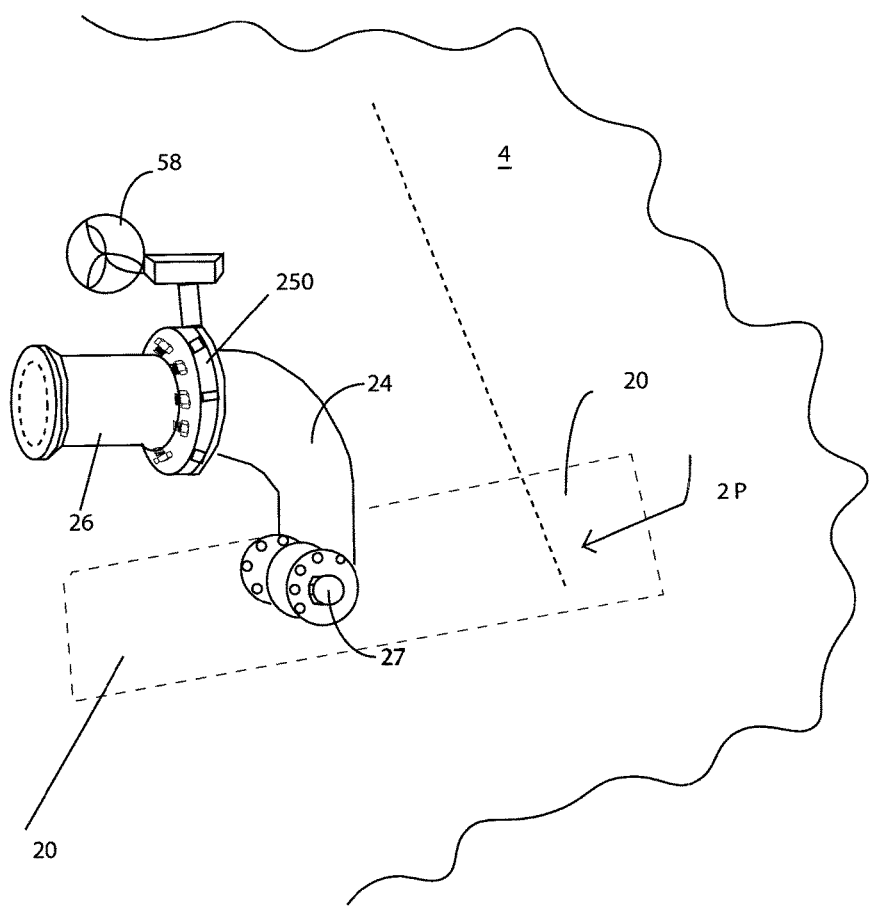
FIG. 6 is a top perspective view of an installed sump prior to the tank wall being erected.

FIG. 6 shows the pre-erection layout of a water tank. The sump 20 has been buried in the trench as shown in FIG. 2. A conduit 26 has been bolted to the hose flange 250. A second drain flange 27 is optional. It is used to empty the sump 20 or for a different size (4 inch) connector. A valve 58 controls the opening of flange 250.

Figure 7:
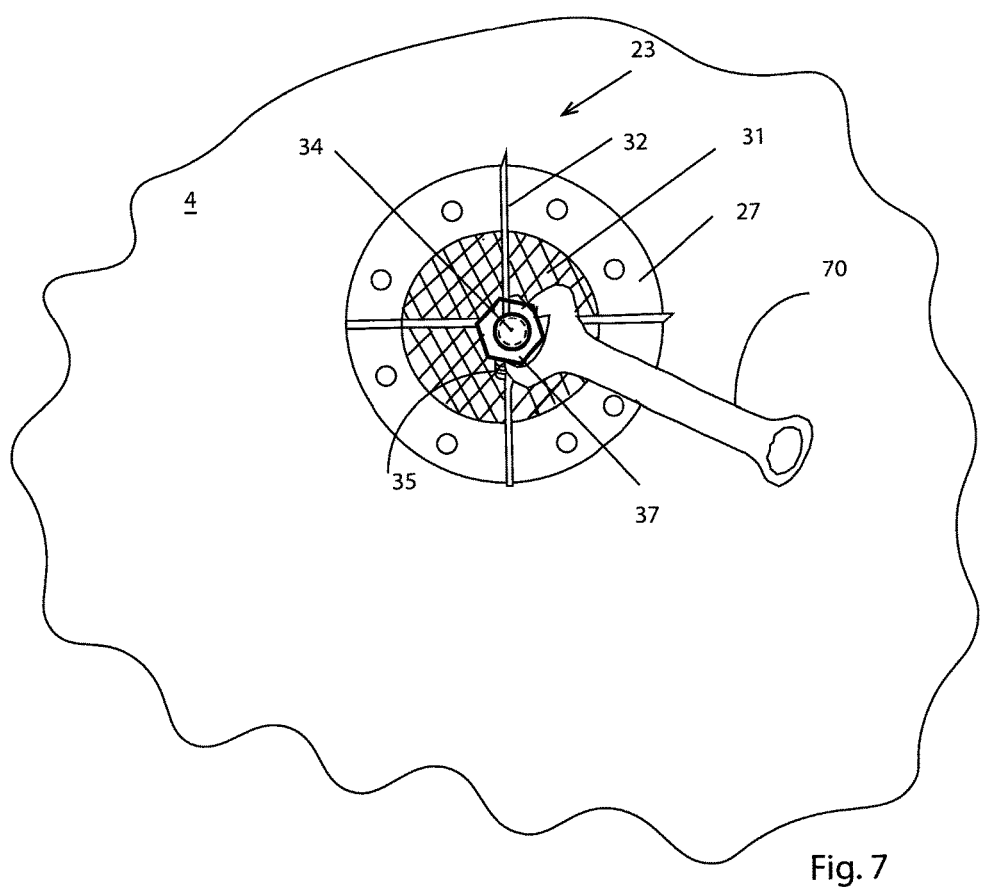
FIG. 7 is a top plan view of the liner connection being tightened.

FIG. 7 provides a top plan view of the liner port 23 being tightened by wrench 70.

Figure 8:
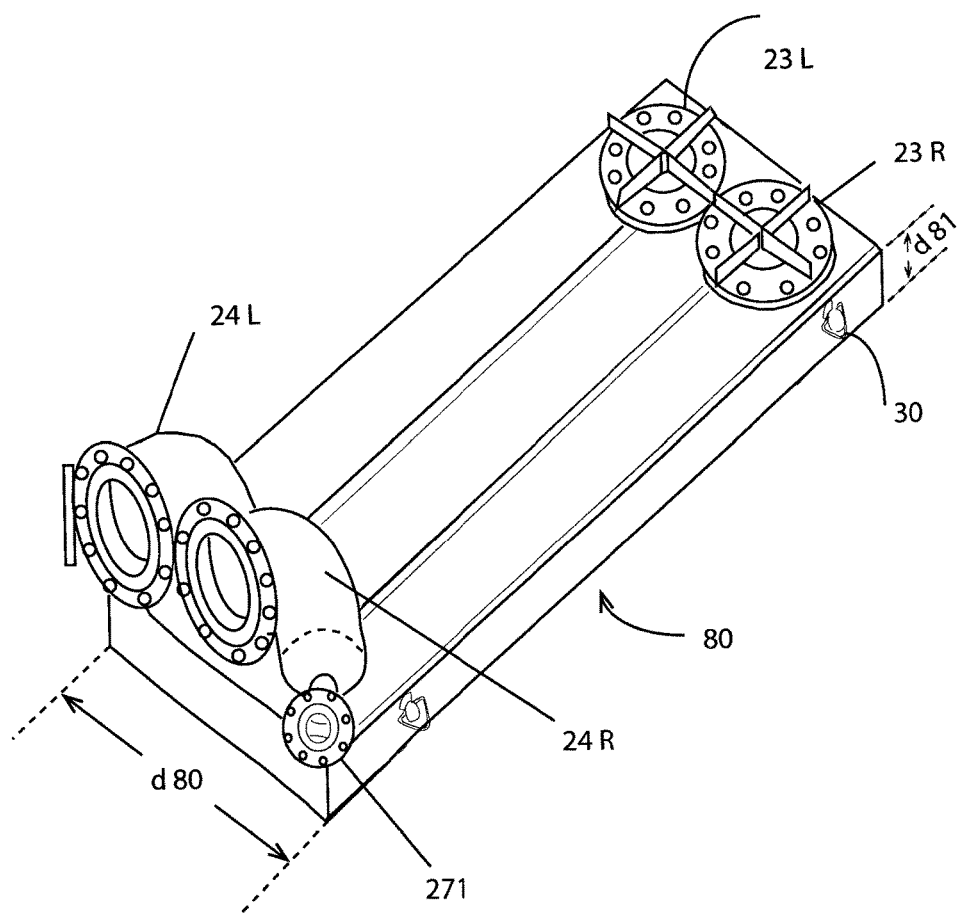
FIG. 8 is a top perspective view of a double inlet sump.
Figure 9:
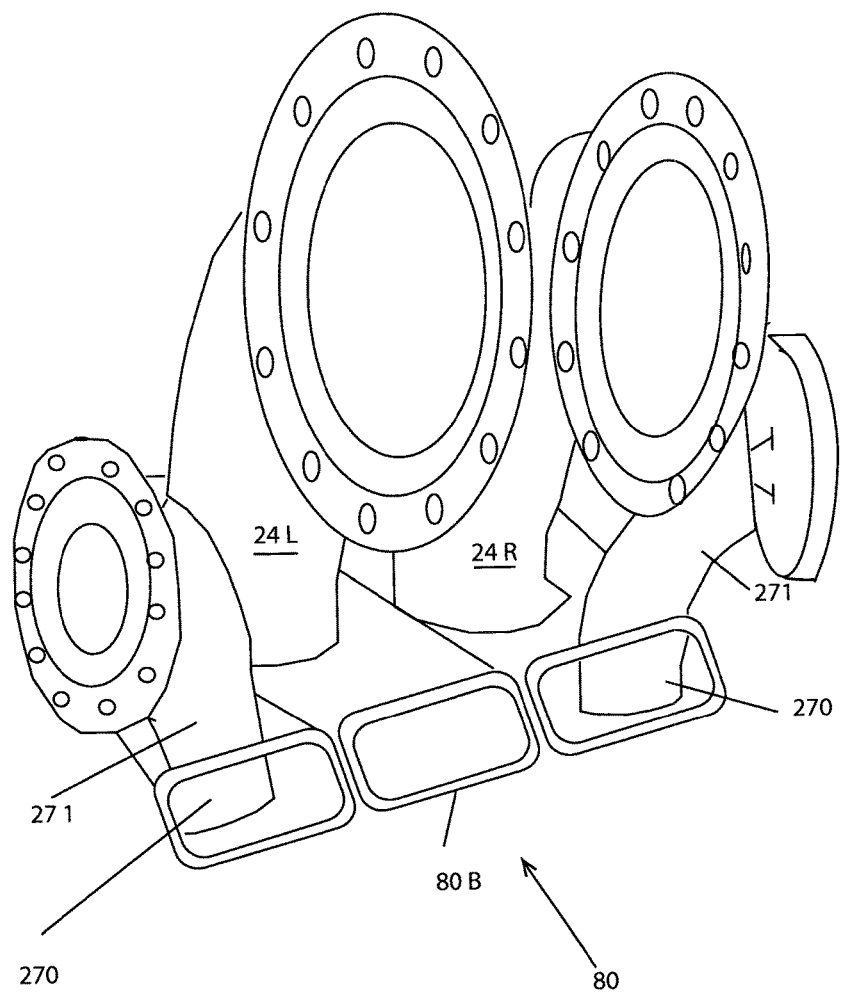
FIG. 9 is a front perspective view of the double inlet sump with the front plate removed.

Referring next to FIGS. 8, 9 a dual port sump 80 has a sump body with a width of (nominally) d80=36, d81=4". There is a left exit port flange 24L and a right exit port flange 24R. There is a left liner port 23L and a right liner port 23R. A smaller exit port flange 271 (shown are two of them) has a descending collar 270 that almost touches the bottom 80B of the sump 80. This allows almost a complete drainage of sump 80 for removal of almost all the water.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A method to fill and empty an above ground water tank, the method comprising the steps of:
    forming a trench;
    placing an underground sump in the trench;
    erecting a tank wall over the underground sump;
    forming an inside port on a top of the underground sump inside the tank wall;
    placing a tank liner over the inside port;
    securing the tank liner over the inside port;
    forming an outside port on the top of the underground sump;
    attaching a filler hose to the outside port; and
    filling and draining the water tank via the outside port.

2. The method of claim 1 further comprising the step of forming a bolt at a center of the inside port with a bottom of the bolt fastened to a bottom of the sump, forming a screen over the inside port, forming a top donut flange over the screen, forming a gasket over the top donut flange, placing the tank liner over the gasket, placing a top gasket over the tank liner, forming an upper top donut flange over the top donut flange and the top gasket, forming a clamp across the upper top donut flange, and tightening the upper top donut flange against the top donut flange using a nut threaded on the bolt.

3. The method of claim 2 further comprising the step of forming an outer port arch over the outside port, the outer port arch having a connecting flange for the filler hose which is used to fill and drain the water tank.

4. The method of claim 3 further comprising the step of forming a second underground sump identical to the underground sump, placing the second underground sump alongside the underground sump, forming fluid communication ports between the underground sump and the second underground sump, and filling and draining the water tank via two outer port arches using two filler hoses.

5. The method of claim 1 further comprising the step of forming an outer port arch over the outside port, the outer port arch having a connecting flange for the filler hose which is used to fill and drain the water tank.

6. The method of claim 5 further comprising the step of forming a second outside port with an outer port arch, wherein a second connecting flange on the outer port arch is of a smaller diameter than the connecting flange, and attaching a second filler hose to the second connecting flange.

7. The method of claim 6 further comprising the step of extending a pipe from the second outside port down to about one inch above a bottom of the sump, and draining the water tank via the second outer port arch.

8. The method of claim 5 further comprising the step of extending a pipe from the outside port down to about one inch above a bottom of the sump, and draining the water tank via the outside port arch.

9. A method to fill and empty an above ground water tank, the method comprising steps of:
    foaming a trench under a wall of an existing above ground water tank;
    placing an underground sump in the trench;
    forming an inside port on a top of the underground sump inside the tank wall;
    placing a tank liner over the inside port;
    securing the tank liner over the inside port;
    forming an outside port on the top of the underground sump;
    attaching a filler hose to the outside port; and
    filling and draining the water tank via the outside port.

10. The method of claim 9 further comprising the step of forming a bolt at a center of the inside part with a bottom of the bolt fastened to a bottom of the sump, forming a screen over the inside port, forming a top donut flange over the screen, forming a gasket over the top donut flange, placing the tank liner over the gasket, placing a gasket over the tank liner, forming an upper top donut flange over the top donut flange and over the top gasket, forming a clamp across the upper top donut flange, and tightening the upper top donut flange against the top donut flange using a nut threaded on the bolt.

11. The method of claim 10 further comprising the step of forming an outer port arch over the outside port, the outer port arch having a connecting flange for the filler hose which is used to fill and drain the water tank.

12. The method of claim 11 further comprising the step of forming a second underground sump identical to the underground sump, placing the second underground sump alongside the underground sump, forming fluid communication ports between the underground sump and the second underground sump, and filling and draining the water tank via two outer port arches using two filler hoses.

13. The method of claim 9 further comprising the step of forming an outer port arch over the outside port, the outer port arch having a connecting flange for the filler hose which is used to fill and drain the water tank.

14. The method of claim 13 further comprising the step of forming a second outside port with an outer port arch, wherein a second connecting flange on the outer port arch is of a smaller diameter than the connecting flange, and attaching a second filler hose to the second connecting flange.

15. The method of claim 14 further comprising the step of extending a pipe from the second outside port down to about one inch above a bottom of the sump, and draining the water tank via the second outer port arch.

16. The method. of claim 13 further comprising the step of extending a pipe from the outside port down to about one inch above a bottom of the sump, and draining the water tank via the outside port arch.

17. A sump for filling and draining an above ground water tank, the sump comprising;
- a flat, rectangular cross section pipe having a length of about seven feet, a width of about one and half feet, a height of about one half foot;
- an inside port on a top adjacent an inside end of the sump;
- said inside port having a mating collar for a tank liner;
- an outside port on the top adjacent an outside end of the sump;
- an outside port arch attached over the outside port and having a mating flange for a filler hose; and
- wherein the mating collar further comprises a central bolt and a nut tightening a clamp collar around the tank liner.

\* \* \* \* \*